United States Patent
Ishii et al.

(10) Patent No.: US 8,373,968 B2
(45) Date of Patent: Feb. 12, 2013

(54) HEXAGONAL TYPE BARIUM TITANATE POWDER, PRODUCING METHOD THEREOF, DIELECTRIC CERAMIC COMPOSITION AND ELECTRONIC COMPONENT

(75) Inventors: Tatsuya Ishii, Tokyo (JP); Hidesada Natsui, Tokyo (JP); Takeo Tsukada, Tokyo (JP); Shinichi Yoda, Sagamihara (JP); Kentei Yono, Sagamihara (JP)

(73) Assignees: TDK Corporation, Tokyo (JP); Japan Aerospace Exploration Agency, Tokyo (JP)

( * ) Notice: Subject to any disclaimer, the term of this patent is extended or adjusted under 35 U.S.C. 154(b) by 193 days.

(21) Appl. No.: 12/941,439

(22) Filed: Nov. 8, 2010

(65) Prior Publication Data
US 2011/0110018 A1 May 12, 2011

(30) Foreign Application Priority Data

Nov. 6, 2009 (JP) .................................. 2009-255519
Nov. 6, 2009 (JP) .................................. 2009-255523
Sep. 30, 2010 (JP) .................................. 2010-222705

(51) Int. Cl.
*H01G 4/06* (2006.01)
(52) U.S. Cl. ............... 361/321.5; 361/301.2; 361/301.4; 361/311; 361/313; 361/321.4
(58) Field of Classification Search ............... 361/321.5, 361/321.4, 301.2, 301.4, 311–313, 321.1, 361/321.2, 306.1, 306.3
See application file for complete search history.

(56) References Cited

U.S. PATENT DOCUMENTS 7,544,245 B2 6/2009 Yono et al.
2011/0110017 A1* 5/2011 Natsui et al. ............... 361/321.1

FOREIGN PATENT DOCUMENTS

| JP | A-2002-293621 | 10/2002 |
| JP | A-2005-53726 | 3/2005 |
| JP | A-2005-213083 | 8/2005 |

OTHER PUBLICATIONS

Wang, S. et al., "Properties of Hexagonal Ba($Ti_{1-x}$,$Mn_x$)$O_3$ Ceramics: Effects of Sintering Temperature and Mn Content," *Japanese Journal of Applied Physics*, 2007, pp. 2978-2983, vol. 46, No. 5A.

(Continued)

*Primary Examiner* — Nguyen T Ha
(74) *Attorney, Agent, or Firm* — Oliff & Berridge, PLC

(57) ABSTRACT

Dielectric ceramic composition includes a hexagonal type barium titanate as a main component shown by a generic formula $(Ba_{1-\alpha}M_\alpha)_A(Ti_{1-\beta}Mn_\beta)_BO_3$ and having hexagonal structure wherein an effective ionic radius of 12-coordinated "M" is −20% or more to +20% or less with respect to an effective ionic radius of 12-coordinated $Ba^{2+}$ and the A, B, $\alpha$ and $\beta$ satisfy relations of $0.900 \leq (A/B) \leq 1.040$, $0.003 \leq \alpha \leq 0.05$, $0.03 \leq \beta \leq 0.2$, and as subcomponents, with respect to the main component, certain contents of alkaline earth oxide such as MgO and the like, $Mn_3O_4$ and/or $Cr_2O_3$, CuO, $Al_2O_3$, rare earth element oxide and glass component including $SiO_2$. According to the present invention, it can be provided the hexagonal type barium titanate powder and dielectric ceramic composition which are preferable for producing electronic components such as a capacitor and the like showing high specific permittivity, having advantageous insulation property and sufficient reliability.

6 Claims, 3 Drawing Sheets

OTHER PUBLICATIONS

Wang et al., "Densification, microstructural evolution, and dielectric properties of hexagonal $Ba(Ti_{1-x}Mn_x)O_3$ ceramics sintered with fluxes," Journal of Alloys and Compounds, vol. 480, pp. 499-504, 2009.

Lee et al., "Effects of Calcination Temperature and A/B Ratio on the Dielectric Properties of $(Ba,Ca)(Ti,Zr,Mn)O_3$ for Multilayer Ceramic Capacitors with Nickel Electrodes," J. Am. Ceram. Soc., vol. 83, No. 6, pp. 1402-1406, 2000.

Langhammer et al., "Influence of Strontium on Manganese-Doped Barium Titanate Ceramics," Materials Letters, vol. 42, pp. 21-24, Jan. 2000.

Fan et al., "Effects of La and Ce on Properties of $BaTiO_3$ Based Dielectric Ceramics," Bulletin of the Chinese Ceramic Society, vol. 25, No. 4, pp. 11-16, Aug. 2006, with English-language Abstract.

Aug. 30, 2012 German Office Action issued in German Application No. 10 2010 050 553.6.

* cited by examiner

HEXAGONAL TYPE BARIUM TITANATE POWDER, PRODUCING METHOD THEREOF, DIELECTRIC CERAMIC COMPOSITION AND ELECTRONIC COMPONENT

BACKGROUND OF THE INVENTION

1. Field of the Invention

The present invention relates to a hexagonal type barium titanate powder, a producing method thereof and a dielectric composition including the hexagonal type barium titanate as a main component, more precisely, relates to a dielectric ceramic composition which shows desired characteristics (for example, extremely high specific permittivity) and is preferable to produce a dielectric layer for electronic components such as a ceramic capacitor and the like which can maintain a sufficient reliability. Also, the present invention relates to an electronic component having dielectric layer composed of the dielectric ceramic composition.

2. Description of the Related Art

In recent years, electric apparatus and electronic apparatus have been rapidly downsized and high performance. Along with that, it has been required to improve various characteristics (specific permittivity, temperature characteristics and the like) of electronic components used for such apparatuses with maintaining sufficient reliability. A ceramic capacitor as one example of electronic components is not exception.

As for dielectric material of such capacitor, particularly for dielectric material having high specific permittivity, tetragonal type barium titanate which includes tetragonal barium titanate as a main component, and cubic type partially has been used. By the way, in recent years, for improving a capacitance, it has been studied to make a dielectric layer thinner. In order to realize to make the dielectric layer thinner, smaller particle diameter of the dielectric particle is preferable. However, when atomizing the tetragonal type barium titanate powder as mentioned above, there was a problem that the specific permittivity is reduced.

As for a material having high specific permittivity, hexagonal barium titanate has been studied. Although the hexagonal barium titanate has essentially low specific permittivity than the tetragonal type barium titanate, in Japanese Patent No. 3941871, it has been suggested that the specific permittivity can be improved extremely by introducing oxygen vacancy to hexagonal barium titanate single crystal.

However, the present inventors have progressed to study based on the teaching in the above mentioned Japanese Patent No. 3941871, it has been found that an insulation property is reduced even though the specific permittivity is improved by introducing the oxygen vacancy. Therefore, when the hexagonal barium titanate having improved specific permittivity by introducing oxygen vacancy is used for element, there is a risk to reduce lifetime of the element and the like.

Also, in a crystal structure of the barium titanate, hexagonal structure is a metastable phase, normally, it can be exist only at 1460° C. or higher. Therefore, in order to obtain the hexagonal barium titanate in a room temperature, it is necessary to cool rapidly from the high temperature of 1460° C. or higher.

In this case, a specific surface area of the obtained hexagonal barium titanate becomes 1 m²/g or less because of the rapid cooling from the high temperature, thus a coarse powder is only obtained. When producing electronic components with thinner dielectric layer by using such coarse powder, there is a problem that it cannot maintain the sufficient reliability, because the powder fails to adapt to the thinner dielectric layer.

By the way, as for a producing method of the hexagonal barium titanate, for example, Non-Patent Literature 1 discloses that $BaCO_3$, $TiO_2$ and $Mn_3O_4$ are used as starting raw materials and are heat-treated. By this means, a transformation temperature to hexagonal phase can be lowered, hexagonal barium titanate in which Mn is solid-soluted is obtained by a heat treatment at a temperature lower than 1460° C.

However, specific surface area of the hexagonal barium titanate obtained in the Non-Patent Document 1 is approximately 1.6 m²/g, thus it is insufficient for applying a thinner dielectric layer in the electronic components even though using this hexagonal barium titanate powder.

Non-Patent Literature 1 is "Properties of Hexagonal $Ba(Ti_{1-x}Mn_x)O_3$ Ceramics: Effects of Sintering Temperature and Mn Content", Japanese Journal of Applied Physics, 2007 Vol. 46 No. 5A 2978-2983.

BRIEF SUMMARY OF THE INVENTION

The present invention has been made by considering such situations and a purpose of the invention is to provide hexagonal type barium titanate powder and dielectric ceramic composition which have hexagonal barium titanate as a main phase, and are preferable to produce a dielectric layer of electronic components such as ceramic capacitor and the like showing extremely high specific permittivity, having advantage insulation property and having sufficient reliability.

In order to achieve the above mentioned purposes, according to keen examination by the present inventors, they have found the electronic components such as ceramic capacitor and the like showing extremely high specific permittivity of the dielectric layer, having advantage insulation property and having sufficient reliability can be obtained by composing a main phase of the dielectric ceramic composition of hexagonal type barium titanate having specific composition so that the present invention has been completed.

Namely, a hexagonal type barium titanate powder according to the present invention includes barium titanate as a main component shown by a generic formula $(Ba_{1-\alpha}M_\alpha)_A(Ti_{1-\beta}Mn_\beta)_BO_3$ and having hexagonal structure wherein an effective ionic radius of 12-coordinated "M" is −20% or more to +20% or less (within ±20%) with respect to an effective ionic radius of 12-coordinated $Ba^{2+}$, the A, B, $\alpha$ and $\beta$ satisfy relations of $0.900 \leq (A/B) \leq 1.040$, $0.003 \leq \alpha \leq 0.05$, $0.03 \leq \beta \leq 0.2$.

In the barium titanate powder according to the present invention, barium titanate powder having hexagonal structure (hexagonal barium titanate) is included as a main component. Specifically, hexagonal barium titanate may be included 50 mass % or more with respect to 100 mass % of hexagonal barium titanate powder according to the present invention.

In the crystal structure of the barium titanate, the hexagonal structure is high temperature stable phase, and exists only at 1460° C. or higher. Therefore, in order to maintain the hexagonal structure at room temperature, it is necessary to cool rapidly from 1460° C. to near the room temperature. When it is rapidly cooled through such the wide temperature range, the hexagonal barium titanate powder obtained after the rapid cooling becomes coarse, and its specific surface area becomes, for example, 1 m²/g or less.

The specific surface area and an average particle diameter of powder are in inverse relationship, thus the specific surface area thereof is substituted in terms of the average particle diameter, it becomes, for example, 1 µm or more. On the other hand, in order to keep reliability sufficiently as electronic components, it is preferable that two or more dielectric particles are placed between the dielectric layers. Therefore, when powder having small specific surface is used, it becomes difficult to make the dielectric layer thinner.

However, as mentioned above, in the crystal structure, the transformation temperature to hexagonal structure can be lowered by substituting a position where Ti occupies (B site) by Mn in a certain ratio. Namely, it is possible to maintain the hexagonal structure even at lower temperature than 1460° C., as a result, the specific surface area can be increased comparatively.

On the other hand, a position where Ba occupies (A site) is substituted by an element "M" in a certain ratio. By having such element included, powder having desired properties can be obtained. For example, rare earth element such as La and the like are included as element "M", it is possible to show extremely high specific permittivity (for example, 10000 or more).

In addition to this, in the present invention, a range of an abundance ratio (A/B) of an element existing at the position where Ba occupies (A site) and an element existing at the position where Bi occupies (B site) is set as above.

By controlling the A/B as above range, grain growth of the barium titanate particle can be suppressed. As a result, the specific surface area of the obtained hexagonal barium titanate powder can be increased further. Specifically, hexagonal barium titanate powder having 2 $m^2$/g or more of the specific surface area can be obtained.

Preferably, a ratio of the α and β satisfies relation of (α/β) ≦40. The "α/β", which shows a ratio of an amount that the A site is substituted by the element "M" (A site substituted amount) and an amount that the B site is substituted by the Mn (B site substituted amount) is set as the above range, an effect of the present invention can be improved further.

Also, a dielectric ceramic composition according the present invention includes hexagonal type barium titanate as a main component shown by a generic formula $(Ba_{1-\alpha}M_\alpha)_A$ $(Ti_{1-\beta}Mn_\beta)_BO_3$ and having hexagonal structure wherein an effective ionic radius of 12-coordinated "M" is −20% or more to +20% or less (within ±20%) with respect to an effective ionic radius of 12-coordinated $Ba^{2+}$, and the A, B, α and β satisfy relations of 0.900≦(A/B)≦1.040, 0.003≦α≦0.05, 0.03≦β≦0.2, and, as subcomponents, with respect to 100 moles of the main component, 1 to 3 moles of at least one of alkaline earth oxide selected from a group consisting of MgO, CaO and BaO in terms of respective oxides, and a total amount of the alkaline earth oxides is 9 moles or less, 0.1 to 1 mole of $Mn_3O_4$ and/or $Cr_2O_3$, CuO and $Al_2O_3$ in terms of respective metal elements, 0.1 to 1 mole of at least one of oxides of rare earth element selected from a group consisting of Y, La, Ce, Pr, Nd, Sm, Gd, Tb, Dy, Ho and Yb in terms of total of rare earth element, and 0.1 to 1 mole of glass component including $SiO_2$ in terms of $SiO_2$.

Also, an electronic component according to the present invention has a dielectric layer composed of the above mentioned dielectric ceramic composition and an internal electrode layer.

Also, a method of producing the hexagonal type barium titanate powder according to the present invention includes steps of preparing a raw material of barium titanate, preparing raw materials of an element "M" and Mn, and heat-treating the raw material of the barium titanate and the raw materials of the element "M" and Mn.

According to the present invention, hexagonal type barium titanate and dielectric ceramic composition which are preferable to produce dielectric layer of electronic components such as ceramic capacitor and the like showing extremely high specific permittivity, having advantageous insulation property and sufficient reliability are maintained.

DETAILED DESCRIPTION OF THE INVENTION

Below, the present invention will be explained based on embodiments shown as follows.
(Multilayer Ceramic Capacitor)

Figure 1:
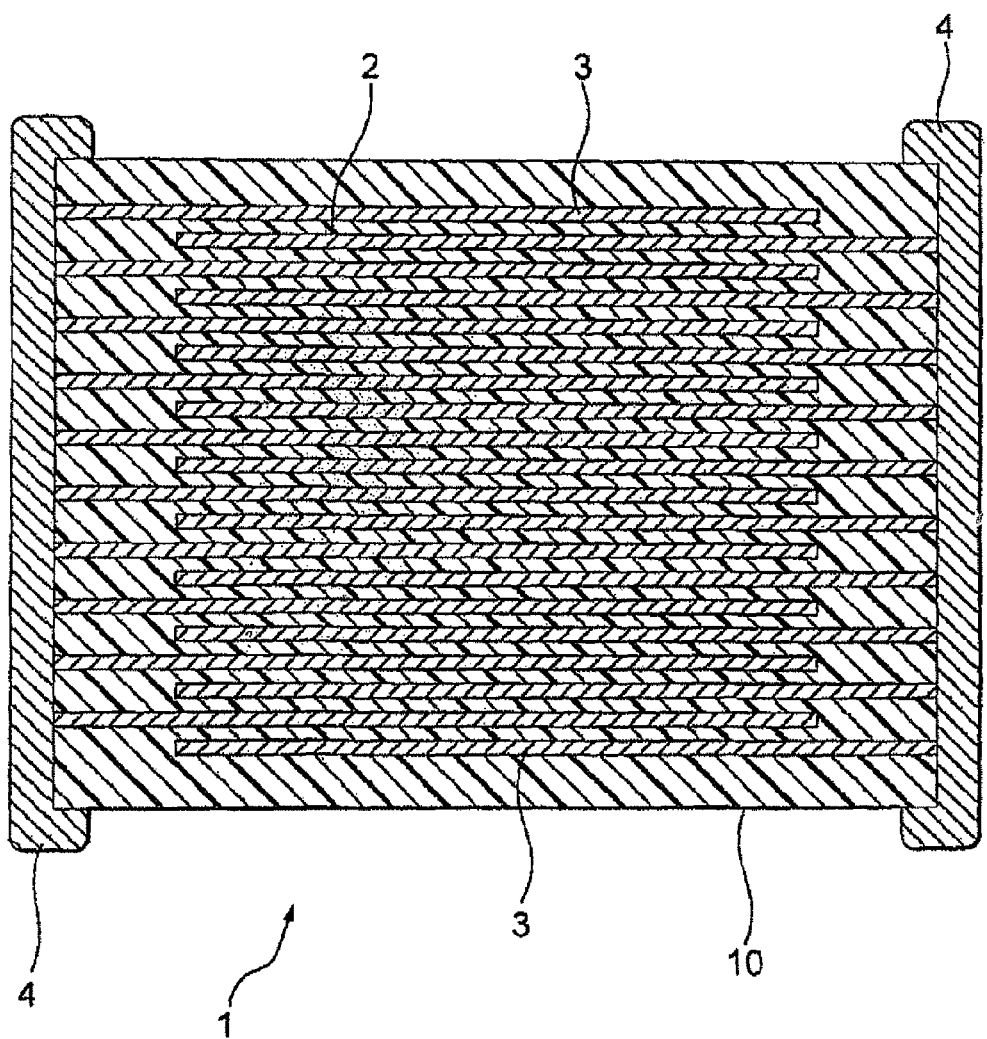
FIG. 1 is a multilayer ceramic capacitor according to one embodiment of the present invention.

As shown in FIG. 1, a multilayer ceramic capacitor 1 as a representative example of electronic components has a capacitor device body 10 wherein a dielectric layer 2 and an internal electrode layer 3 are alternately stacked. At the both end portions of the capacitor device body 10, a pair of external electrodes 4 connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

The dielectric layer 2 includes dielectric ceramic composition according to the present embodiment. The dielectric ceramic composition according to the present embodiment has a main phase composed of hexagonal type barium titanate, and includes specific subcomponents. Note that, although compositional formulas of various oxides are shown in the following, the amount of oxygen (O) can be slightly deviate from the above stoichiometric constitution.

Firstly, it will be explained that the hexagonal type barium titanate which is a main component and constitutes a main phase of the dielectric ceramic composition according to the present embodiment. The main phase composed of the hexagonal type barium titanate is formed by using following mentioned hexagonal type barium titanate powder as raw material and firing thereof with subcomponents.
(Hexagonal Type Barium Titanate Powder)

The hexagonal type barium titanate powder according to the present embodiment has barium titanate powder having hexagonal structure (hexagonal barium titanate) as a main component. Specifically, 50 mass % or more, preferably 90 mass % or more, further preferably 95 mass % or more of hexagonal barium titanate is included with respect to 100 mass % of the hexagonal type barium titanate powder according to the present embodiment.

Note that, in the hexagonal type barium titanate powder according to the present embodiment, barium titanate having tetragonal structure or cubic structure may be included other than the hexagonal barium titanate.

The hexagonal type barium titanate powder according to the present embodiment can be shown by using a generic formula $(Ba_{1-\alpha}M_\alpha)_A (Ti_{1-\beta}Mn_\beta)_BO_3$.

The α in the above formula shows a substitution ratio of an element "M" with respect to Ba (content of the "M" in the hexagonal barium type titanate powder), it is $0.003 \leq \alpha \leq 0.05$, more preferably $0.008 \leq \alpha \leq 0.03$, further preferably $0.01 \leq \alpha \leq 0.03$. When the content of the "M" is too small, desired properties tend not to be obtained. On the contrary, when the content of the "M" is too large, a transformation temperature to the hexagonal structure becomes higher, thus powder having large specific surface area tends not to be obtained.

In the hexagonal structure, although the "Ba" occupies an "A" site position as $Ba^{2+}$, in the present embodiment, the "M" substitutes the Ba in the above mentioned range and exists at the "A" site position. Namely, the element "M" is solid-soluted in the barium titanate. By existing the "M" at the "A" site position, desired properties can be obtained.

The "M" has an effective ionic radius (12-coordinated) of −20% or more to +20% or less (within ±20%) with respect to an effective ionic radius of 12-coordinated $Ba^{2+}$ (1.61 pm). The Ba can be substituted easily by "M" having such effective ionic radius.

Specifically, as the element "M", it is preferably at least one selected from Dy, Gd, Ho, Y, Er, Yb, La, Ce and Bi. The element "M" may be selected depending on desired properties. Specifically, in order to generate extremely high specific permittivity, it is preferably to select at least one from La, Ce and Bi.

The β in the above formula shows a substitution ratio of Mn with respect to Ti (content of Mn in the hexagonal type barium titanate powder), it is $0.03 \leq \beta \leq 0.20$, preferably $0.05 \leq \beta \leq 0.15$, further preferably $0.08 \leq \beta \leq 0.12$. When the content of the Mn is too small or too large, powder having large specific surface area tends not to be obtained, because a transformation temperature to hexagonal structure becomes higher.

In the hexagonal structure, although the Ti occupies a "B" site position as $Ti^{4+}$, in the present embodiment, the Mn substitutes the Ti in the above mentioned range and exists at the "B" site position. Namely, the Mn is solid-soluted in the barium titanate. By existing the Mn at the "B" site position, the transforming temperature from tetragonal/cubic structure to the hexagonal structure in the barium titanate can be lowered.

The "A" and "B" in the above formula respectively show a ratio of elements (Ba and M) occupying the "A" site and a ratio of elements (Ti and Mn) occupying the "B" site. In the present embodiment, a ratio of (A/B) is $0.900 \leq A/B \leq 1.040$, preferably $0.958 \leq A/B \leq 1.036$.

When A/B is too small, reactivity at time of generating the barium titanate becomes high so that it will be easy to fasten particle growth to temperature. Therefore, it is hard to obtain a fine particle and thus desired specific surface area tends not to be obtained. On the contrary, when A/B is too large, it is not preferable because an occupying ratio of Ba becomes larger so that Ba-rich barium orthotitanate ($Ba_2TiO_4$) tends to generate as a phase different from that of barium titanate.

The hexagonal type barium titanate powder according to the present embodiment has the above mentioned constitution, and is produced by following specified method. Therefore, when the specific surface area immediately after producing is measured by BET method, it becomes $2 \text{ m}^2/\text{g}$ or more, preferably $3 \text{ m}^2/\text{g}$ or more, further preferably $4 \text{ m}^2/\text{g}$ or more.

As a result, for example, even in case that dielectric layer of a multilayer ceramic electronic component is made thinner (e.g., thickness of interlayer: 1 μm), a number of the barium titanate particle placed between the interlayer can be at least 2 or more so that sufficient reliability (high temperature load lifetime) can be maintained.

Note that, although the specific surface area can be increased by pulverizing the obtained powder with using a ball mill and the like, in this case, particle size distribution becomes broader. As a result, deviation of particle size is larger and deviation of reliability is larger, which is not preferable. Also, an impact (energy) and the like added to the powder when pulverizing gives an adverse effect to the powder, which is not preferable. Therefore, it is preferable that the specific surface area thereof is larger at a condition when the hexagonal barium titanate is generated. Note that, the effective ionic radius described in the present specification is values based on a literature "R. D. Shannon Acta Crystallogr., A32, 751 (1967)".

(Producing Method of Hexagonal Type Barium Titanate Powder)

Next, a method of producing hexagonal type barium titanate powder according to the present embodiment will be explained.

Firstly, a raw material of barium titanate, a raw material of element "M" and a raw material of Mn are prepared.

As for the raw material of the barium titanate, barium titanate ($BaTiO_3$), oxides (BaO, $TiO_2$) composing barium titanate and mixture thereof may be used. Further, it is possible to properly select from various other compounds to become the above-mentioned oxides or composite oxides by firing, for example, carbonate, oxalate, nitrate, hydroxide, organic metallic compounds, etc., to use by mixing. Specifically, as for a raw material for the barium titanate, $BaTiO_3$ may be used, $BaCO_3$ and $TiO_2$ may be used. In the present embodiment, $BaCO_3$ and $TiO_2$ are preferably used.

Note that, when $BaTiO_3$ is used for the raw material of the barium titanate, it may be barium titanate having tetragonal structure, barium titanate having cubic structure or barium titanate having hexagonal structure. Also, it may be mixture thereof.

Specific surface areas of the above mentioned raw materials are preferably 5 to 100 $m^2/g$, more preferably 10 to 50 $m^2/g$. As for a measuring method for the specific surface area, although it is not particularly limited, for example, BET method is exemplified.

Also, as for a raw material of the element "M", compounds of the element "M" may be used, for example, it is possible to properly select from oxides, carbonate, oxalate, nitrate, hydroxide and organic metallic compounds, etc., to use by mixing. As for a raw material of the Mn, it may be used in a similar manner with the raw materials for the element "M".

Specific surface areas of these raw materials are preferably 5 to 50 $m^2/g$, further preferably 10 to 20 $m^2/g$.

Next, the prepared raw materials are mixed after weighing so as to be a predetermined compositional ratio, and mixture of raw materials is obtained, if needed, by pulverizing. As for methods of mixing and pulverizing, for example, it can be exemplified a wet method for mixing and pulverizing wherein the raw materials are put into a conventionally known grinding container such as a ball mill and the like with solvent such as water, etc. Also, it may be mixed and pulverized by a drying method wherein a drying mixer, etc. is used. At this time, in order to improve dispersibility of the input raw materials, it is preferable to add a dispersing agent. As for the dispersing agent, conventionally known agent may be used.

Next, heat-treatment is performed to the obtained mixture of raw materials after drying if needed. A temperature rising rate at the heat-treatment is preferably 50 to 900° C./h. Also, a holding time at the heat-treatment may be set as higher than a transforming temperature to a hexagonal structure. In the present embodiment, the transformation temperature is below 1460° C., and it changes depending on A/B, "A" site substitution amount (α) and "B" site substitution amount (β), etc., thus the holding temperature can be changed depending on these. In order to increase a specific surface area of the powder, for example, it is preferably set as 1000 to 1300° C. A holding time is preferably 0.5 to 5 hours, further preferably 2 to 4 hours.

By performing the heat-treatment, Mn is solid-soluted in $BaTiO_3$, Ti positioned at "B" site can be substituted by Mn. As a result, the transforming temperature to the hexagonal structure can be lower than temperature at the heat-treatment, the hexagonal type barium titanate can be generated easily. Also, by the element "M" is solid-soluted in $BaTiO_3$ so as to substitute Ba at "A" site position, desired properties are occurred.

Note that, when the holding temperature is too low, non-reacted and/or insufficient-reacted raw material (for example, $BaCO_3$ and the like) tends to be generated as a phase different from $BaTiO_3$.

Then, after passing the holding time of the heat-treatment, it is cooled from the holding temperature of the heat-treatment to a room temperature so as to maintain hexagonal structure. Specifically, the cooling rate is preferably set as 200° C./h or more.

By performing this, hexagonal type barium titanate powder, which includes hexagonal barium titanate as a main component wherein hexagonal structure is maintained at room temperature, can be obtained. Although it is not particularly limited to examine as to whether the obtained powder is hexagonal type barium titanate powder or not, in the present embodiment, it is examined by X-ray diffraction method.

Firstly, it is examined as to whether a peak other than a peak originated from barium titanate (hexagonal, cubic, tetragonal) exists or not by a X-ray diffraction chart obtained by the X-ray diffraction method. If such peak exist, it is not preferable because the phase different from $BaTiO_3$ ($Ba_2TiO_4$, $BaCO_3$ and the like) is generated in the obtained powder.

When the phase different from $BaTiO_3$ is not generated, namely, the obtained powder is composed of barium titanate ($BaTiO_3$) only, it is examined by calculating a generating ratio of the hexagonal barium titanate. Specifically, a total of maximum peak intensities of hexagonal barium titanate, tetragonal barium titanate and cubic barium titanate is defined as 100%, a ratio that occupies the maximum peak intensity of the hexagonal barium titanate is defined as a generating ratio (abundance ratio) of the hexagonal barium titanate. When this ratio is 50% or more, the hexagonal type barium titanate powder which includes the hexagonal barium titanate as a main component can be obtained.

The hexagonal type barium titanate powder can be obtained by rapidly cooling from a temperature lower than a temperature at which hexagonal barium titanate stably exists normally (1460° C. or higher), thus it can be obtained as fine particle. Further, because composition and A/B ratio, etc. of the hexagonal type barium titanate are controlled within the above range, further fine particle can be obtained. Specifically, the specific surface area of the hexagonal type barium titanate according to the present embodiment is preferably 2 $m^2/g$ or more, more preferably 3 $m^2/g$ or more, further preferably 4 $m^2/g$ or more.

Note that the above mentioned specific surface area is a value when the obtained hexagonal type barium titanate powder is generated, also it has extremely sharp particle size distribution and a single peak.

Electronic components having dielectric layers and electrode layers are produced by using the hexagonal type barium titanate powder obtained by the above manner and following mentioned subcomponents.

<Subcomponents>

As for subcomponents, at least one of alkaline earth oxide selected from a group consisting of MgO, CaO and BaO, as metallic oxides, $Mn_3O_4$ and/or $Cr_2O_3$, CuO and $Al_2O_3$, and oxides of at least one of rare earth element selected from a group consisting of Y, La, Ce, Pr, Nd, Sm, Gd, Tb, Dy, Ho and Yb, and glass component including $SiO_2$ are used.

The MgO and the like have an effect to make flattening capacitance-temperature characteristic, reducing dielectric loss, improving an insulation resistance. In the present embodiment, content of at least one of alkaline earth oxides selected from the group consisting of MgO, Cao and BaO in terms of respective oxides is 1 to 3 moles, preferably 1 to 2 moles with respect to 100 moles of the main component. Here the content of the alkaline earth oxide is not a total of the respective oxides, it means contents of the respective oxides. Also, as far as the MgO, CaO and BaO in terms of oxide respectively are used in a range of 1 to 3 moles, it can be used as single kind alone, or may be used by combining two kinds or more. For example, an embodiment wherein 3 moles of MgO, 3 moles of CaO and 3 moles of BaO are used is included in a scope of the present invention. On the other hand, an embodiment wherein 0.5 mole of MgO, 0.5 mole of CaO and 0.5 mole of BaO are used is not included in the scope of the present invention, although a total content is within a range of 1 to 3 moles. Also, an embodiment wherein 0 mol of MgO, 3 moles of CaO and 3 moles of BaO are used is included in the scope of the present invention because the contents of the CaO and BaO is within a range of 1 to 3 moles.

Further, in addition to satisfy the above range, a total content of the MgO, CaO and BaO in terms of oxides is within a range of 9 moles or less, preferably 4 to 8 moles, further preferably 3 to 5 moles. For example, an embodiment wherein 3 moles of MgO, 3 moles of CaO and 4 moles of BaO are used is not included in the embodiment of the present invention because a total content of the MgO, CaO and BaO becomes 10 mol, although contents of MgO and CaO are within a range of 1 to 3 moles.

Metal oxides such as $Mn_3O_4$ have effects of improving sintering, making insulation resistance (IR) higher and improving IR lifetime. In the present embodiment, respective contents of $Mn_3O_4$ and/or $Cr_2O_3$, CuO and $Al_2O_3$ in terms of respective metal element are 0.1 to 1 mole, preferably 0.2 to 0.8 mol, further preferably 0.4 to 0.5 mol with respect to 100 moles of the main component. Here, the content of the above mentioned metal oxides are not a total of the respective oxides, it means the contents of the respective oxides. Also, the contents are defined in terms of metal element not in terms of metallic oxide. For example, when using 0.1 mole of $Al_2O_3$, it means 0.2 mole in terms of Al element is used. Also, unlike the above mentioned alkaline earth oxides, $Mn_3O_4$ and/or $Cr_2O_3$, CuO and $Al_2O_3$ are respectively used as 0.1 to 1 mole in terms of metal element. For example, an embodiment wherein 1 mole of $Mn_3O_4$ (3 moles of Mn element), 0.2 mole of CuO (0.2 mol of CuO) and 0.1 mole of $Al_2O_3$ (0.2 mol of Al element) are used is not included in the scope of the present invention because the content of the $Mn_3O_4$ is out of the range defined in the present invention.

Although a total content of the $Mn_3O_4$ and/or $Cr_2O_3$, CuO and $Al_2O_3$ is not particularly limited, preferably within a range of 0.5 to 3 moles, more preferably 1 to 2 moles.

Content of oxides of at least one of rare earth element selected from a group consisting of Y, La, Ce, Pr, Nd, Sm, Gd, Tb, Dy, Ho and Yb in terms of rare earth element in total is 0.1 to 1 mole, preferably 0.2 to 0.8 mole, further preferably, 0.3 to 0.6 mole. As for the rare earth element oxides, oxides of Y, Gd, Tb, Dy, Ho or Yb are preferably used. These rare earth elements may be used as a single kind alone, also, they may be used as combined, and similar effects can be obtained. When the content of the rare earth element oxide is less than 0.1 mole, effects of improving insulation resistance, improving reliability (acceleration lifetime) and reducing dielectric loss cannot be obtained. Also, when the content of the rare earth oxides excesses 1 mole, the specific permittivity tends to reduced.

Glass component including $SiO_2$ is added as sintering aid. Although the glass component is not particularly limited as far as $SiO_2$ is included, it may be an amorphous complex oxide wherein $SiO_2$ is complexed with any one of ZnO, $B_2O_3$ and $Al_2O_3$.

Content of the glass component including $SiO_2$ in terms of $SiO_2$ is 0.1 to 1 mole, preferably 0.2 to 0.8 mol, further preferably 0.3 to 0.6 mol with respect to 100 moles of the main component. When the content of the glass component is less than 0.1 mole, it does not work as sintering aid. Also, when the content of the glass component excesses 1 mole, the specific permittivity is reduced and a voltage withstanding also deteriorates. Further, a voltage dependence of the insulation resistance tends to become larger.

Also, other subcomponents may be added to the above mentioned dielectric ceramic composition within a range which is available to achieve the purpose of the present invention.

(Multilayer Ceramic Capacitor)

Although a thickness of a dielectric layer 2 in a multilayer ceramic capacitor 1 shown in FIG. 1 which is a representative example of electronic components is not particularly limited, it is preferable 5 μm or less per one layer, more preferably 3 μm or less. Although a lower limit of the thickness is not particularly limited, for example, it is approximately 1 μm. Due to the dielectric ceramic composition according to the present embodiment, 50 or more of specific permittivity is shown with 1 μm or more of thickness. Although a number of stacked layers is not particularly limited, it is preferable 200 or more.

An average crystal particle diameter of dielectric particle included in the dielectric layer 2 is not particularly limited, it may be determined from, for example, a range of 0.1 to 1 μm, preferably 0.1 to 0.5 μm depending on the thickness of the dielectric layer 2. Note that, the average crystal particle diameter included in the dielectric layer is measured as follows. Firstly, the obtained capacitor sample is cut with a vertical plane to an internal electrode, the cut face is polished. Then, chemical etching is performed to the polished face, after this, it is observed by a scanning electron microscope (SEM), and calculated by a code method with assuming a shape of the dielectric particulate is sphere.

Although conducting material included in an internal electrode layer 3 is not particularly limited, base metals can be used because the material constituting the dielectric layer 2 has reduction to resistance. As for the base metals used for the conducting material, Ni or Ni alloy is preferable. As for the Ni alloy, an alloy of at least one kinds of element selected from Mn, Cr, Co and Al with Ni is preferable, and Ni content in the alloy is preferably 95 wt % or more.

Although conducting material included in an external electrode 4 is not particularly limited, in the present invention, inexpensive Ni, Cu and their alloys may be used. A thickness of the external electrode 4 may be determined depending on a purpose of use, in normally, it is preferable about 10 to 50 μm.

A multilayer ceramic capacitor in which the dielectric ceramic composition of the present embodiment is used, is produced by, as similar with a conventional multilayer ceramic capacitor, producing a green chip by a normal printing method or sheet method using a paste, then firing thereof, and firing after printing or transferring an external electrode. Below, a method of producing will be explained specifically.

Firstly, dielectric ceramic composition powder included in dielectric layer paste is prepared. Specifically, a raw material of main component and a raw material of subcomponent are mixed by a ball mill and the like so that a dielectric ceramic composition powder is obtained.

As for a raw material of the main component, the above mentioned hexagonal type barium titanate powder is used. As for raw materials of the subcomponents, although the above mentioned oxide and mixture thereof, complex oxides thereof can be used, other than these, various kinds of compounds which becomes the above mentioned oxide and complex oxide by firing, for example, suitably selected from carbonate, oxalate, nitrate, hydroxide, organometallic compounds can be used by mixing too.

Content of the respective compounds in the obtained dielectric ceramic composition powder may be determined so that it becomes composition of the above mentioned dielectric ceramic composition after firing.

Calcining and the like may be further performed to the above mentioned main component and subcomponents. Note that, as for the calcining condition, for example, a calcining temperature may be set as preferably 800 to 1100° C., a calcining time may be set as preferably 1 to 4 hours.

Then, the obtained dielectric ceramic composition powder is made into a paste to prepare the dielectric layer paste. The dielectric layer paste may be an organic paste kneaded with dielectric ceramic composition powder and the organic vehicle, or it may be a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned paste is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total contents of these are preferably 10 wt % or less.

When using the printing method, the dielectric layer paste and the internal electrode layer paste are printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. The binder removal treatment may be suitably determined depending on the type of the conducting material in the internal electrode paste. However when using base metal such as Ni or Ni alloy as the conducting material, it is preferable that oxygen partial pressure of binder removal atmosphere is set to $10^{-45}$ to $10^5$ Pa. When the oxygen partial pressure is less than the above range, binder removal effect is reduced. Also, when the oxygen partial pressure exceeds the above range, the internal electrode layer tends to oxidize.

Also, as for the binder removal condition other than this, a temperature rising rate is preferable 5 to 300° C./hr, more preferably 10 to 100° C./hr, a holding temperature is preferably 180 to 400° C., further preferably 200 to 350° C., a temperature holding time is preferably 0.5 to 24 hours, further preferably 2 to 20 hours. Also, firing atmosphere is preferably air or reducing atmospheres, as for an atmospheric gas in the reducing atmosphere, for example, a wet mixture gas of $N_2$ and $H_2$ is preferably used.

The atmosphere when firing the green chip can be suitably determined depending on the type of the conducting material in the internal electrode paste. However when using base metal such as Ni or Ni alloy as the conducting material, the oxygen partial pressure of the firing atmosphere is preferably $10^{-9}$ to $10^{-4}$ Pa. When the oxygen partial pressure is below the above range, the conducting material of the internal electrode layer may have abnormal sintering which results in a breakage thereof. Also, when the oxygen partial pressure exceeds the above range, the internal electrode layer tends to oxidize.

Also, the holding temperature at the firing is preferably 900 to 1200° C., and more preferably 1000 to 1100° C. When the holding temperature is below the above range, the densification becomes insufficient; and when it exceeds the above range, the breakage of the electrode due to the abnormal sinter of the internal electrode layer, the deterioration of the capacitance-temperature characteristics due to the dispersion of the constitution material of the internal electrode layer, or a reduction of the dielectric ceramic composition tend to occur.

As for other firing condition other than the above, a temperature rising rate is preferably 50 to 500° C./hr, more preferably 200 to 300° C./hr, a temperature holding time is preferably 0.5 to 8 hours, more preferably 1 to 3 hours, a cooling rate is preferably 50 to 500° C./hr, more preferably 200 to 300° C./hr. Also, firing atmosphere is preferably reducing atmosphere, as for an atmospheric gas in the reducing atmosphere, for example, a wet mixture gas of $N_2$ and $H_2$ is preferably used.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-3}$ Pa or more, particularly preferably $10^{-2}$ to 10 Pa. When the oxygen partial pressure is below the above range, it may be difficult to reoxidize the dielectric layer. When it exceeds the above range, the internal electrode layer tends to be oxidized.

Holding temperature at annealing is preferably 1100° C. or less, particularly preferably 500 to 900° C. When the holding temperature is below the above range, the dielectric layer may not be sufficiently oxidized, often resulting in lowering IR and shortening IR lifetime. On the other hand, when the holding temperature exceeds the above range, the internal electrode layer is not only oxidized to reduce the capacitance, but also reacts with the dielectric body, which may easily cause deteriorated capacitance-temperature characteristics, reduced IR, and reduction in IR lifetime. Note that the annealing may consist of a temperature rising process and temperature cooling process. Namely, the temperature holding time may be zero. In this case, the holding temperature is same as the maximum temperature.

As for other annealing conditions other than the above, the temperature holding time is preferably 0 to 20 hours, more preferably 2 to 10 hours, and the cooling rate is preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so.

The binder removal treatment, firing and annealing may be performed continuously or independently.

An end face polishing is conducted to a capacitor body obtained as the above, for example by barrel polishing or sandblast, an external electrode paste is printed or transferred and fired so that an external electrode 4 is formed. A firing condition of the external electrode paste is preferably, for example, about 10 minute to 1 hour at 600 to 800° C. in wet mixture gas of $N_2$ and $H_2$. Then, if needed, a coating layer is formed on a surface of the external electrode 4 by plating and the like.

The multilayer ceramic capacitor of the present invention produced according to the above is used for various electronic components and the like by mounting on a printed-circuit board and the like by soldering and the like.

The foregoing has described embodiment of the present invention, however, the present invention is not limited to the above mentioned embodiment at all, and various modification can be made within a scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above composition. Also, in the above mentioned embodiment, although the hexagonal type barium titanate powder according to the present invention is produced by so called a solid phase method, it may be produced by oxalate method, sol-gel method and the like.

EXAMPLES

Below, the present invention will be explained based on further detailed examples, however, the present invention is not limited to these examples. Note that, in the following examples and comparative examples, "specific permittivity/ ∈", "insulation resistance" and "dielectric loss/tan δ" were measured as follows.

(Specific permittivity/E, Insulation Resistance and Dielectric Loss/tan δ)

A capacitance C was measured to a capacitor sample, under a criterion temperature 20° C., a frequency 1 kHz, an input signal level (measured voltage) 0.5 Vrms/μm was inputted by a digital LCR meter (YHP4274A made by Yokogawa Electric Corp.). Then, the specific permittivity (without unit) was calculated based on the obtained capacitance, a thickness of the dielectric body of the multilayer ceramic capacitor and overlapping area of each internal electrode.

Then, insulation resistance IR was measured after applying DC 50V during 60 seconds at 25° C. to the capacitor sample by using an insulation resistance meter (R8340A made by Advantest Corp.).

Dielectric loss (tan δ) was measured under a condition that a frequency 1 kHz, an input signal level (measured voltage) 0.5 Vrms to the capacitor sample by a digital LCR meter (4274A made by YHP).

Experimental Example 1

Preparation of Hexagonal Type Barium Titanate Powder

At first, $BaCO_3$ (specific surface area: 25 $m^2/g$) and $TiO_2$ (specific surface area: 50 $m^2/g$) were prepared as raw materials of barium titanate. Also, $La(OH)_3$ (specific surface area: 10 $m^2/g$) was prepared as a raw material of the element "M", and $Mn_3O_4$ (specific surface area: 20 $m^2/g$) was prepared as a raw material of Mn.

These raw materials were weighed so that "α", "β", "A/B" in a generic formula $(Ba_{1-\alpha}M_\alpha)_A(Ti_{1-\beta}Mn_\beta)_BO_3$ satisfy the values shown in Table 1 respectively and mixed with water and dispersing agent by a ball-mill. The obtained mixed powder was heat-treated under following mentioned heat-treatment condition so that hexagonal type barium titanate powder was produced.

The heat-treatment condition was that temperature rising rate: 200° C./hr, holding temperature: temperature shown in Table 1, temperature holding time: 2 hours, cooling rate: 200° C./hr, atmospheric gas: air.

Following mentioned X-ray diffraction was performed to the obtained hexagonal type barium titanate powder. Also, a specific surface area was measured by BET method. Results of the specific surface area are shown in Table 3.

<X-ray Diffraction>

For the X-ray diffraction, Cu—Kα ray was used as a X-ray source, measuring condition thereof was 45 kV voltage, 2θ=20° to 90° with electric current 40 mA, scanning speed 4.0 deg/min, elapsed time 30 sec.

Figure 2A:
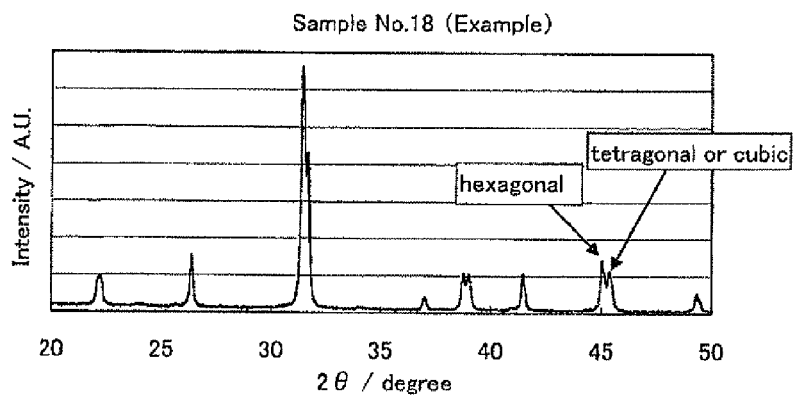
FIG. 2A to FIG. 2C are X-ray diffraction chart of samples of examples and comparative examples according to the present invention.
Figure 2B:
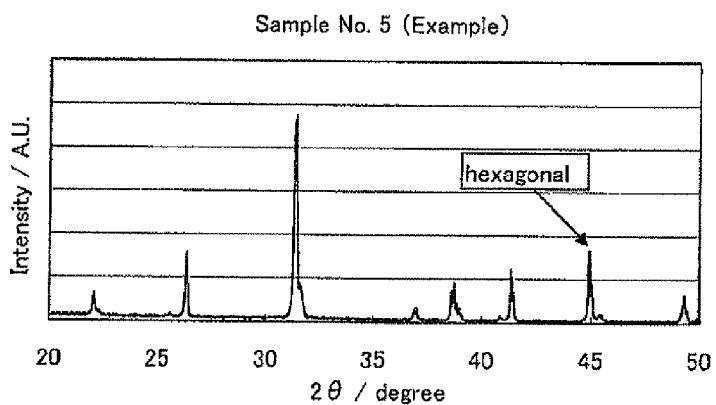
Figure 2C:
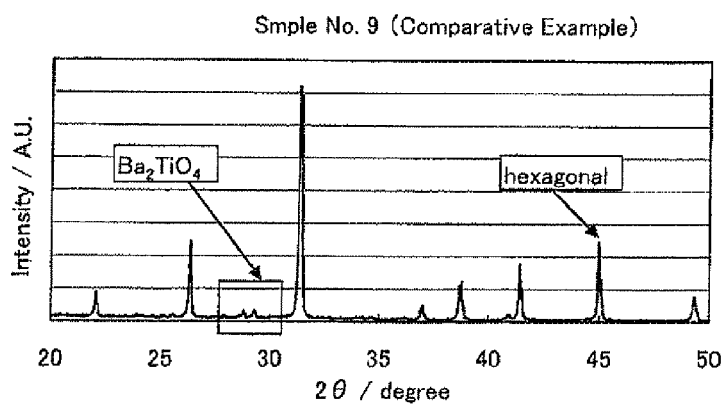

From X-ray diffraction chart obtained by the measurement, identifying respective peaks near 2θ=45°, evaluation was made as to whether barium titanate (hexagonal, tetragonal, cubic) and phase different from barium titanate were existed. Results are shown in Table 1. The X-ray diffraction chart with respect to sample Nos. 18, 5 and 9 are shown in FIG. 2A to FIG. 2C.

Next, with respect to samples wherein only peak of barium titanate was observed, maximum peak intensities of hexagonal barium titanate (h-$BaTiO_3$), tetragonal barium titanate (t-$BatiO_3$), cubic barium titanate (c-$BaTiO_3$) were calculated. Then, an occupied ratio of the maximum peak intensity of h-$BaTiO_3$ to a total of maximum peak intensities of h-$BaTiO_3$, t-$BaTiO_3$ and c-$BaTiO_3$ were calculated so that a ratio of hexagonal barium titanate (h-$BaTiO_3$) was evaluated. Results of the obtained rate were shown in Table 2.

TABLE 1

$(Ba_{1-\alpha}La_\alpha)_A(Ti_{1-\beta}Mn_\beta)_BO_3$

| Sample No. | A site substitution amount α | B site substitution amount β | α/β | A/B | Identified phase by X-ray diffraction Heat-treating temperature | | | | | | | |
|---|---|---|---|---|---|---|---|---|---|---|---|---|
| | | | | | 1000° C. | 1050° C. | 1100° C. | 1150° C. | 1200° C. | 1250° C. | 1300° C. | 1350° C. |
| 1 | 0.003 | 0.14 | 0.02 | 0.885 | mixed phase | mixed phase | mixed phase | mixed phase | mixed phase | mixed phase | h-BT | h-BT |
| 2 | 0.003 | 0.14 | 0.02 | 0.904 | mixed phase | mixed phase | mixed phase | mixed phase | mixed phase | mixed phase | h-BT | h-BT |
| 3 | 0.003 | 0.14 | 0.02 | 0.958 | mixed phase | mixed phase | mixed phase | mixed phase | h-BT | h-BT | h-BT | h-BT |
| 4 | 0.003 | 0.14 | 0.02 | 1.006 | NG | NG | h-BT | h-BT | h-BT | h-BT | h-BT | h-BT |
| 5 | 0.003 | 0.14 | 0.02 | 1.008 | NG | NG | h-BT | h-BT | h-BT | h-BT | h-BT | h-BT |
| 6 | 0.003 | 0.14 | 0.02 | 1.026 | NG | NG | h-BT | h-BT | h-BT | h-BT | h-BT | h-BT |
| 7 | 0.003 | 0.14 | 0.02 | 1.036 | NG | NG | h-BT | h-BT | h-BT | h-BT | h-BT | h-BT |
| 8 | 0.003 | 0.14 | 0.02 | 1.040 | NG | NG | NG | mixed phase | h-BT | h-BT | h-BT | h-BT |
| 9 | 0.003 | 0.14 | 0.02 | 1.085 | NG | NG | NG | NG | NG | NG | NG | NG |
| 10 | 0 | 0.14 | 0.00 | 1.000 | NG | NG | h-BT | h-BT | h-BT | h-BT | h-BT | h-BT |
| 5 | 0.003 | 0.14 | 0.02 | 1.008 | NG | NG | h-BT | h-BT | h-BT | h-BT | h-BT | h-BT |
| 11 | 0.01 | 0.14 | 0.07 | 1.008 | NG | NG | mixed phase | h-BT | h-BT | h-BT | h-BT | h-BT |
| 12 | 0.03 | 0.14 | 0.21 | 1.008 | NG | NG | NG | NG | mixed phase | mixed phase | mixed phase | mixed phase |
| 13 | 0.05 | 0.14 | 0.36 | 1.008 | NG | NG | NG | NG | mixed phase | mixed phase | mixed phase | mixed phase |
| 14 | 0.07 | 0.14 | 0.50 | 1.008 | NG | NG | NG | NG | mixed phase | mixed phase | mixed phase | mixed phase |
| 15 | 0.16 | 0.14 | 1.14 | 1.008 | NG | NG | NG | NG | mixed phase | mixed phase | mixed phase | mixed phase |
| 16 | 0.01 | 0.01 | 1.00 | 1.008 | NG | NG | NG | NG | NG | NG | NG | NG |
| 17 | 0.01 | 0.03 | 0.33 | 1.008 | NG | NG | mixed phase | mixed phase | mixed phase | mixed phase | mixed phase | mixed phase |
| 18 | 0.01 | 0.04 | 0.25 | 1.008 | NG | NG | mixed phase | mixed phase | mixed phase | mixed phase | mixed phase | mixed phase |
| 19 | 0.01 | 0.07 | 0.14 | 1.008 | NG | NG | mixed phase | mixed phase | mixed phase | mixed phase | mixed phase | mixed phase |
| 20 | 0.01 | 0.1 | 0.10 | 1.008 | NG | NG | mixed phase | mixed phase | h-BT | h-BT | h-BT | h-BT |
| 11 | 0.01 | 0.14 | 0.07 | 1.008 | NG | NG | mixed phase | h-BT | h-BT | h-BT | h-BT | h-BT |
| 21 | 0.01 | 0.2 | 0.05 | 1.008 | NG | NG | mixed phase | mixed phase | h-BT | h-BT | h-BT | h-BT |
| 22 | 0.01 | 0.25 | 0.04 | 1.008 | NG | mixed phase | mixed phase | mixed phase | mixed phase | mixed phase | h-BT | h-BT |

"h-BT" shows h-$BaTiO_3$
"mixed phase" shows two phases or more are identified among h-BT, t-BT and c-BT.

TABLE 2

| Sample No. | $(Ba_{1-\alpha}La_\alpha)_A(Ti_{1-\beta}Mn_\beta)_BO_3$ A site substitution amount α | B site substitution amount β | α/β | A/B | Generating rate of h-BaTiO$_3$ [%] Heat-treating temperature 1000° C. | 1050° C. | 1100° C. | 1150° C. | 1200° C. | 1250° C. | 1300° C. | 1350° C. |
|---|---|---|---|---|---|---|---|---|---|---|---|---|
| 1 | 0.003 | 0.14 | 0.02 | 0.885 | 0.0 | 16.5 | 33.3 | 46.6 | 61.3 | 91.5 | 100.0 | 100.0 |
| 2 | 0.003 | 0.14 | 0.02 | 0.904 | 16.1 | 31.7 | 47.1 | 59.1 | 71.4 | 93.7 | 100.0 | 100.0 |
| 3 | 0.003 | 0.14 | 0.02 | 0.958 | 67.9 | 75.1 | 86.3 | 94.7 | 100.0 | 100.0 | 100.0 | 100.0 |
| 4 | 0.003 | 0.14 | 0.02 | 1.006 | | | 95.9 | 100.0 | 100.0 | 100.0 | 100.0 | 100.0 |
| 5 | 0.003 | 0.14 | 0.02 | 1.008 | | | 100.0 | 100.0 | 100.0 | 100.0 | 100.0 | 100.0 |
| 6 | 0.003 | 0.14 | 0.02 | 1.026 | | | 100.0 | 100.0 | 100.0 | 100.0 | 100.0 | 100.0 |
| 7 | 0.003 | 0.14 | 0.02 | 1.036 | | | 100.0 | 100.0 | 100.0 | 100.0 | 100.0 | 100.0 |
| 8 | 0.003 | 0.14 | 0.02 | 1.040 | | | | 100.0 | 100.0 | 100.0 | 100.0 | 100.0 |
| 9 | 0.003 | 0.14 | 0.02 | 1.085 | | | | | | | | |
| 10 | 0 | 0.14 | 0.00 | 1.000 | | | | 100.0 | 100.0 | 100.0 | 100.0 | 100.0 |
| 5 | 0.003 | 0.14 | 0.02 | 1.008 | | | 100.0 | 100.0 | 100.0 | 100.0 | 100.0 | 100.0 |
| 11 | 0.01 | 0.14 | 0.07 | 1.008 | | | 90.5 | 98.1 | 100.0 | 100.0 | 100.0 | 100.0 |
| 12 | 0.03 | 0.14 | 0.21 | 1.008 | | | | | 72.8 | 78.9 | 85.4 | 84.1 |
| 13 | 0.05 | 0.14 | 0.36 | 1.008 | | | | | | 56.6 | 56.4 | 55.4 |
| 14 | 0.07 | 0.14 | 0.50 | 1.008 | | | | | | 42.0 | 41.5 | 42.2 |
| 15 | 0.16 | 0.14 | 1.14 | 1.008 | | | | | | 0.0 | 0.0 | 0.0 |
| 16 | 0.01 | 0.01 | 1.00 | 1.008 | | | | | | | | |
| 17 | 0.01 | 0.03 | 0.33 | 1.008 | | | 28.3 | 37.1 | 46.2 | 56.0 | 64.3 | 72.1 |
| 18 | 0.01 | 0.04 | 0.25 | 1.008 | | | 36.9 | 45.4 | 55.2 | 63.8 | 71.4 | 74.3 |
| 19 | 0.01 | 0.07 | 0.14 | 1.008 | | | 55.8 | 67.4 | 79.8 | 88.4 | 91.0 | 89.9 |
| 20 | 0.01 | 0.1 | 0.10 | 1.008 | | | 77.7 | 85.1 | 98.5 | 100.0 | 100.0 | 100.0 |
| 11 | 0.01 | 0.14 | 0.07 | 1.008 | | | 90.5 | 98.1 | 100.0 | 100.0 | 100.0 | 100.0 |
| 21 | 0.01 | 0.2 | 0.05 | 1.008 | | | 58.0 | 74.6 | 100.0 | 100.0 | 100.0 | 100.0 |
| 22 | 0.01 | 0.25 | 0.04 | 1.008 | | 24.2 | 34.9 | 48.4 | 59.0 | 84.8 | 100.0 | 100.0 |

TABLE 3

| Sample No. | $(Ba_{1-\alpha}La_\alpha)_A(Ti_{1-\beta}Mn_\beta)_BO_3$ A site substitution amount α | B site substitution amount β | α/β | A/B | Specific surface area of obtained powder [m$^2$/g] Heat-treating temperature 1000° C. | 1050° C. | 1100° C. | 1150° C. | 1200° C. | 1250° C. | 1300° C. | 1350° C. |
|---|---|---|---|---|---|---|---|---|---|---|---|---|
| 1 | 0.003 | 0.14 | 0.02 | 0.885 | | | | | | — | — | — |
| 2 | 0.003 | 0.14 | 0.02 | 0.904 | | | | 2.0 | 1.2 | — | — | — |
| 3 | 0.003 | 0.14 | 0.02 | 0.958 | 6.9 | 5.1 | 3.6 | 1.9 | 0.2 | — | — | — |
| 4 | 0.003 | 0.14 | 0.02 | 1.006 | | | 5.1 | 3.1 | 1.0 | — | — | — |
| 5 | 0.003 | 0.14 | 0.02 | 1.008 | | | 5.5 | 3.4 | 1.6 | 0.6 | — | — |
| 6 | 0.003 | 0.14 | 0.02 | 1.026 | | | 5.0 | 3.2 | 1.2 | — | — | — |
| 7 | 0.003 | 0.14 | 0.02 | 1.036 | | | 4.7 | 3.0 | 1.1 | — | — | — |
| 8 | 0.003 | 0.14 | 0.02 | 1.040 | | | | 2.7 | 1.3 | 0.3 | — | — |
| 9 | 0.003 | 0.14 | 0.02 | 1.085 | | | | | | | | |
| 10 | 0 | 0.14 | 0.00 | 1.000 | | | 1.6 | — | — | — | — | — |
| 5 | 0.003 | 0.14 | 0.02 | 1.008 | | | 5.5 | 3.4 | 1.6 | 0.6 | — | — |
| 11 | 0.01 | 0.14 | 0.07 | 1.008 | | | 5.9 | 3.0 | 1.4 | — | — | — |
| 12 | 0.03 | 0.14 | 0.21 | 1.008 | | | | | 5.1 | 3.3 | 2.1 | 0.6 |
| 13 | 0.05 | 0.14 | 0.36 | 1.008 | | | | | | 4.0 | 2.7 | 1.2 |
| 14 | 0.07 | 0.14 | 0.50 | 1.008 | | | | | | | | |
| 15 | 0.16 | 0.14 | 1.14 | 1.008 | | | | | | | | |
| 16 | 0.01 | 0.01 | 1.00 | 1.008 | | | | | | | | |
| 17 | 0.01 | 0.03 | 0.33 | 1.008 | | | | | | 2.1 | 0.8 | — |
| 18 | 0.01 | 0.04 | 0.25 | 1.008 | | | | | 2.7 | 1.4 | 0.6 | — |
| 19 | 0.01 | 0.07 | 0.14 | 1.008 | | | 8.1 | 5.3 | 3.2 | 1.3 | 0.6 | — |
| 20 | 0.01 | 0.1 | 0.10 | 1.008 | | | 7.0 | 4.7 | 2.3 | — | — | — |
| 11 | 0.01 | 0.14 | 0.07 | 1.008 | | | 5.9 | 3.0 | 1.4 | — | — | — |
| 21 | 0.01 | 0.2 | 0.05 | 1.008 | | | 4.8 | 2.5 | 1.1 | — | — | — |
| 22 | 0.01 | 0.25 | 0.04 | 1.008 | | | | | 0.4 | — | — | — |

From FIG. 2A to FIG. 2O, in sample No. 18 (example), h-BaTiO$_3$, t-BaTiO$_3$ and c-BaTiO$_3$ were confirmed. Note that, t-BaTiO$_3$ and c-BaTiO$_3$ are not distinguished because their peaks are close. Also, in sample No. 5 (example), only a phase of the hexagonal barium titanate was confirmed.

In contrast, in sample No. 9 (comparative example), a phase of barium orthotitanate (Ba$_2$TiO$_4$) is confirmed near 2θ=29°, it was confirmed a phase other than barium titanate was generated.

From Table 1, when the heat-treatment temperature is lower, phases other than barium titanate (barium carbonate, barium orthotitanate and the like) were identified as shown in FIG. 2O, thus it was confirmed undesirable tendency.

Also, when the A/B is too large, the "A" site substitution amount is too large and the "B" site substitution amount is too low, a phase other than barium titanate is identified, even though the heat treatment temperature was risen. Thus it was confirmed that undesirable tendency.

In Table 2, samples to which h-BaTiO$_3$ generating rate was not measured were shown by diagonal line. From Table 2, the "A" site substitution amount is larger, or the "B" site substitution amount is too low, h-BaTiO$_3$ generating rate becomes lower, thus it was confirmed undesirable tendency.

From Table 3, it was confirmed that when the "A" site substitution amount is 0, a specific surface area of the hexagonal type barium titanate powder becomes smaller than 2 m$^2$/g, which is not desirable tendency. Also, it was confirmed that hexagonal type barium titanate powder whose specific surface area is 2 m$^2$/g or more can be obtained by setting the within a range of the present invention, and by controlling the heat-treatment temperature appropriately.

Figure 3:
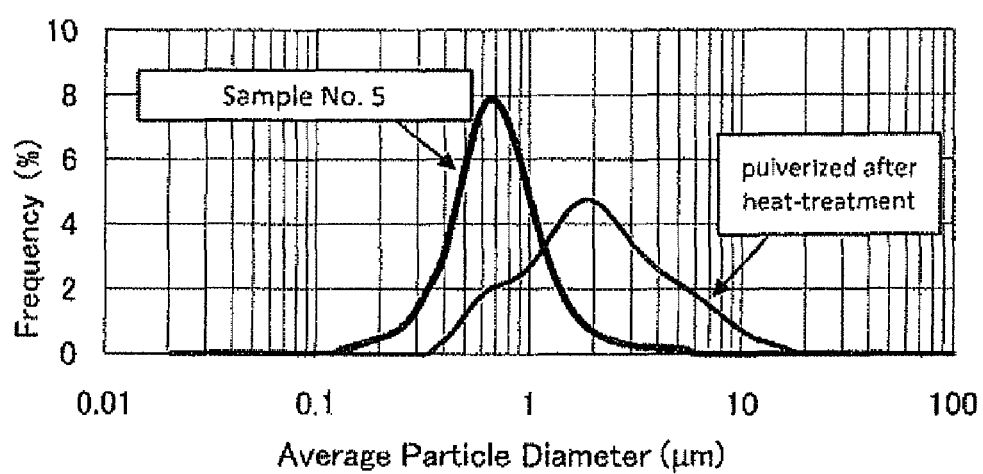
FIG. 3 is a graph showing particle size distribution of samples of examples and comparative examples according to the present invention.

In FIG. 3, particle size distributions of sample No. 5 (example) and a sample of powder produced by heat-treating hexagonal barium titanate at 1500° C. and further pulverizing are shown. A specific surface area of the sample 5 was 5.5 m$^2$/g. On the other hand, for the sample pulverized after heat-treatment, a specific surface area before pulverization (immediately after producing) was 0.9 m$^2$/g, a specific surface area of after pulverization was 5.4 m$^2$/g.

As it is clear from FIG. 3, the specific surface areas of both samples are about same level, however, particle size distributions are quite different, it was confirmed that the sample of example can obtain sharp distribution. In contrast, even though the specific surface is increased by pulverizing the powder immediately after producing, it was confirmed that the particle size distribution becomes broader, which is not preferable.

Experimental Example 2

Except for setting a ratio of the "A" site substitution amount and the "B" site substitution amount (α/β3) to the values shown in Table 4, a powder was produced as similar with the experimental example 1, a specific surface area was measured and X-ray diffraction was performed. Results are shown in Tables 4 to 6.

TABLE 4

$(Ba_{1-\alpha}La_\alpha)_A(Ti_{1-\beta}Mn_\beta)_BO_3$

| Sample No. | A site substitution amount α | B site substitution amount β | α/β | A/B | Identified phase by X-ray diffraction Heat-treating temperature | | | | | | | |
|---|---|---|---|---|---|---|---|---|---|---|---|---|
| | | | | | 1000° C. | 1050° C. | 1100° C. | 1150° C. | 1200° C. | 1250° C. | 1300° C. | 1350° C. |
| 31 | 0.003 | 0.1 | 0.03 | 1.008 | NG | NG | h-BT | h-BT | h-BT | h-BT | h-BT | h-BT |
| 20 | 0.01 | 0.1 | 0.10 | 1.008 | NG | NG | mixed phase | mixed phase | h-BT | h-BT | h-BT | h-BT |
| 32 | 0.03 | 0.1 | 0.30 | 1.008 | NG | NG | NG | mixed phase | mixed phase | mixed phase | mixed phase | mixed phase |
| 33 | 0.05 | 0.1 | 0.50 | 1.008 | NG | NG | NG | NG | NG | mixed phase | mixed phase | mixed phase |
| 34 | 0.16 | 0.1 | 1.60 | 1.008 | NG | NG | NG | NG | NG | mixed phase | mixed phase | mixed phase |
| 19 | 0.01 | 0.07 | 0.14 | 1.008 | NG | NG | mixed phase | mixed phase | mixed phase | mixed phase | mixed phase | mixed phase |
| 35 | 0.03 | 0.07 | 0.43 | 1.008 | NG | NG | NG | NG | NG | mixed phase | mixed phase | mixed phase |
| 36 | 0.05 | 0.07 | 0.71 | 1.008 | NG | NG | NG | NG | NG | mixed phase | mixed phase | mixed phase |
| 18 | 0.01 | 0.04 | 0.25 | 1.008 | NG | NG | mixed phase | mixed phase | mixed phase | mixed phase | mixed phase | mixed phase |
| 37 | 0.03 | 0.04 | 0.75 | 1.008 | NG | NG | NG | NG | NG | mixed phase | mixed phase | mixed phase |
| 38 | 0.05 | 0.04 | 1.25 | 1.008 | NG | NG | NG | NG | NG | mixed phase | mixed phase | mixed phase |
| 16 | 0.01 | 0.01 | 1.00 | 1.008 | NG | NG | NG | NG | NG | NG | NG | NG |
| 39 | 0.03 | 0.01 | 3.00 | 1.008 | NG | NG | NG | NG | NG | NG | NG | NG |
| 40 | 0.05 | 0.01 | 5.00 | 1.008 | NG | NG | NG | NG | NG | NG | NG | NG |

"h-BT" shows h-BaTiO$_3$
"mixed phase" shows two phases or more are identified among h-BT, t-BT and c-BT.

"A" site substation amount and "B" site substitution amount

TABLE 5

$(Ba_{1-\alpha}La_\alpha)_A(Ti_{1-\beta}Mn_\beta)_BO_3$

| Sample No. | A site substitution amount α | B site substitution amount β | α/β | A/B | Generating rate of h-BaTiO$_3$ [%] Heat-treating temperature | | | | | | | |
|---|---|---|---|---|---|---|---|---|---|---|---|---|
| | | | | | 1000° C. | 1050° C. | 1100° C. | 1150° C. | 1200° C. | 1250° C. | 1300° C. | 1350° C. |
| 31 | 0.003 | 0.1 | 0.03 | 1.008 | | | 95.9 | 98.4 | 98.9 | 100.0 | 100.0 | 100.0 |
| 20 | 0.01 | 0.1 | 0.10 | 1.008 | | | 77.7 | 85.1 | 98.5 | 100.0 | 100.0 | 100.0 |
| 32 | 0.03 | 0.1 | 0.30 | 1.008 | | | | 50.1 | 55.5 | 57.5 | 64.6 | 61.5 |
| 33 | 0.05 | 0.1 | 0.50 | 1.008 | | | | | | 38.6 | 36.1 | 36.2 |

TABLE 5-continued

| | $(Ba_{1-\alpha}La_\alpha)_A(Ti_{1-\beta}Mn_\beta)_BO_3$ | | | | Generating rate of h-BaTiO$_3$ [%] Heat-treating temperature | | | | | | | |
|---|---|---|---|---|---|---|---|---|---|---|---|---|
| Sample No. | A site substitution amount α | B site substitution amount β | α/β | A/B | 1000° C. | 1050° C. | 1100° C. | 1150° C. | 1200° C. | 1250° C. | 1300° C. | 1350° C. |
| 34 | 0.16 | 0.1 | 1.60 | 1.008 | | | | | | 0.0 | 0.0 | 0.0 |
| 19 | 0.01 | 0.07 | 0.14 | 1.008 | | | 55.8 | 67.4 | 79.8 | 88.4 | 91.0 | 89.9 |
| 35 | 0.03 | 0.07 | 0.43 | 1.008 | | | | | | 40.8 | 47.8 | 45.2 |
| 36 | 0.05 | 0.07 | 0.71 | 1.008 | | | | | | 22.9 | 20.2 | 19.7 |
| 18 | 0.01 | 0.04 | 0.25 | 1.008 | | | 36.9 | 45.4 | 55.2 | 63.8 | 71.4 | 74.3 |
| 37 | 0.03 | 0.04 | 0.75 | 1.008 | | | | | | 18.6 | 21.5 | 18.0 |
| 38 | 0.05 | 0.04 | 1.25 | 1.008 | | | | | | 20.8 | 19.8 | 19.5 |
| 16 | 0.01 | 0.01 | 1.00 | 1.008 | | | | | | | | |
| 39 | 0.03 | 0.01 | 3.00 | 1.008 | | | | | | | | |
| 40 | 0.05 | 0.01 | 5.00 | 1.008 | | | | | | | | |

TABLE 6

| | $(Ba_{1-\alpha}La_\alpha)_A(Ti_{1-\beta}Mn_\beta)_BO_3$ | | | | Specific surface area of obtained powder [m²/g] Heat-treating temperature | | | | | | | |
|---|---|---|---|---|---|---|---|---|---|---|---|---|
| Sample No. | A site substitution amount α | B site substitution amount β | α/β | A/B | 1000° C. | 1050° C. | 1100° C. | 1150° C. | 1200° C. | 1250° C. | 1300° C. | 1350° C. |
| 31 | 0.003 | 0.1 | 0.03 | 1.008 | | | 5.1 | 2.5 | 0.6 | — | — | — |
| 20 | 0.01 | 0.1 | 0.10 | 1.008 | | | 7.0 | 4.7 | 2.3 | — | — | — |
| 32 | 0.03 | 0.1 | 0.30 | 1.008 | | | 8.2 | 5.8 | 4.0 | 2.4 | 0.7 | |
| 33 | 0.05 | 0.1 | 0.50 | 1.008 | | | | | | | | |
| 34 | 0.16 | 0.1 | 1.60 | 1.008 | | | | | | | | |
| 19 | 0.01 | 0.07 | 0.14 | 1.008 | | | 8.1 | 5.3 | 3.2 | 1.3 | 0.6 | — |
| 35 | 0.03 | 0.07 | 0.43 | 1.008 | | | | | | | | |
| 36 | 0.05 | 0.07 | 0.71 | 1.008 | | | | | | | | |
| 18 | 0.01 | 0.04 | 0.25 | 1.008 | | | | | 2.7 | 1.4 | 0.6 | — |
| 37 | 0.03 | 0.04 | 0.75 | 1.008 | | | | | | | | |
| 38 | 0.05 | 0.04 | 1.25 | 1.008 | | | | | | | | |
| 16 | 0.01 | 0.01 | 1.00 | 1.008 | | | | | | | | |
| 39 | 0.03 | 0.01 | 3.00 | 1.008 | | | | | | | | |
| 40 | 0.05 | 0.01 | 5.00 | 1.008 | | | | | | | | |

From Tables 4 to 6, it was confirmed in case that the ratio of the "A" site substitution amount and the "B" site substitution amount (α/β) were changed, when the α/β is too large, the hexagonal type barium titanate whose the specific surface area is 2 m²/g or more tends to be hard to be obtained.

Experimental Example 3

Except for using oxides, carbonate and hydroxide of elements shown in Table 7 as a raw material of the element "M" instead of La(OH)$_3$, a powder was produced as similar with the experimental example 1, a specific surface area was measured and X-ray diffraction was performed. Results are shown in Tables 7 to 9.

TABLE 7

| | $(Ba_{1-\alpha}M_\alpha)_A(Ti_{1-\beta}Mn_\beta)_BO_3$ | | | | | | Identified phase by X-ray diffraction Heat-treating temperature | | | | | | | |
|---|---|---|---|---|---|---|---|---|---|---|---|---|---|
| | | A site substitution amount | B site substitution amount | | | | | | | | | | | |
| Sample No. | element "M" | α | β | α/β | A/B | 1000° C. | 1050° C. | 1100° C. | 1150° C. | 1200° C. | 1250° C. | 1300° C. | 1350° C. |
| 11 | La | 0.01 | 0.14 | 0.07 | 1.008 | NG | NG | mixed phase | h-BT | h-BT | h-BT | h-BT | h-BT |
| 51 | Dy | 0.01 | 0.14 | 0.07 | 1.008 | NG | NG | mixed phase | h-BT | h-BT | h-BT | h-BT | h-BT |
| 52 | Gd | 0.01 | 0.14 | 0.07 | 1.008 | NG | NG | mixed phase | h-BT | h-BT | h-BT | h-BT | h-BT |

TABLE 7-continued

| | $(Ba_{1-\alpha}M_\alpha)_A(Ti_{1-\beta}Mn_\beta)_BO_3$ | | | | | | | | | | | |
|---|---|---|---|---|---|---|---|---|---|---|---|---|
| | A site | B site | | | | | | | | | | |
| Sample No. | sub-stitution element "M" | sub-stitution amount α | sub-stitution amount β | α/β | A/B | Identified phase by X-ray diffraction Heat-treating temperature | | | | | | |
| | | | | | | 1000° C. | 1050° C. | 1100° C. | 1150° C. | 1200° C. | 1250° C. | 1300° C. | 1350° C. |
| 53 | Ho | 0.01 | 0.14 | 0.07 | 1.008 | NG | NG | mixed phase | h-BT | h-BT | h-BT | h-BT | h-BT |
| 54 | Y  | 0.01 | 0.14 | 0.07 | 1.008 | NG | NG | mixed phase | h-BT | h-BT | h-BT | h-BT | h-BT |
| 55 | Er | 0.01 | 0.14 | 0.07 | 1.008 | NG | NG | mixed phase | h-BT | h-BT | h-BT | h-BT | h-BT |
| 56 | Yb | 0.01 | 0.14 | 0.07 | 1.008 | NG | NG | mixed phase | h-BT | h-BT | h-BT | h-BT | h-BT |
| 57 | Ce | 0.01 | 0.14 | 0.07 | 1.008 | NG | NG | mixed phase | h-BT | h-BT | h-BT | h-BT | h-BT |
| 58 | Bi | 0.01 | 0.14 | 0.07 | 1.008 | NG | NG | mixed phase | h-BT | h-BT | h-BT | h-BT | h-BT |

"h-BT" shows h-BaTiO$_3$
"mixed phase" shows two phases or more are identified among h-BT, t-BT and c-BT.

TABLE 8

| | $(Ba_{1-\alpha}M_\alpha)_A(Ti_{1-\beta}Mn_\beta)_BO_3$ | | | | | | | | | | | |
|---|---|---|---|---|---|---|---|---|---|---|---|---|
| | A site | B site | | | | | | | | | | |
| Sample No. | sub-stitution element "M" | sub-stitution amount α | sub-stitution amount β | α/β | A/B | Generating rate of h-BaTiO$_3$ [%] Heat-treating temperature | | | | | | |
| | | | | | | 1000° C. | 1050° C. | 1100° C. | 1150° C. | 1200° C. | 1250° C. | 1300° C. | 1350° C. |
| 11 | La | 0.01 | 0.14 | 0.07 | 1.008 | NG | NG | 90.5 | 98.1 | 100.0 | 100.0 | 100.0 | 100.0 |
| 51 | Dy | 0.01 | 0.14 | 0.07 | 1.008 | NG | NG | 89.9 | 100.0 | 100.0 | 100.0 | 100.0 | 100.0 |
| 52 | Gd | 0.01 | 0.14 | 0.07 | 1.008 | NG | NG | 89.7 | 100.0 | 100.0 | 100.0 | 100.0 | 100.0 |
| 53 | Ho | 0.01 | 0.14 | 0.07 | 1.008 | NG | NG | 91.0 | 100.0 | 100.0 | 100.0 | 100.0 | 100.0 |
| 54 | Y  | 0.01 | 0.14 | 0.07 | 1.008 | NG | NG | 92.2 | 97.9  | 100.0 | 100.0 | 100.0 | 100.0 |
| 55 | Er | 0.01 | 0.14 | 0.07 | 1.008 | NG | NG | 90.5 | 100.0 | 100.0 | 100.0 | 100.0 | 100.0 |
| 56 | Yb | 0.01 | 0.14 | 0.07 | 1.008 | NG | NG | 92.1 | 100.0 | 100.0 | 100.0 | 100.0 | 100.0 |
| 57 | Ce | 0.01 | 0.14 | 0.07 | 1.008 | NG | NG | 92.0 | 100.0 | 100.0 | 100.0 | 100.0 | 100.0 |
| 58 | Bi | 0.01 | 0.14 | 0.07 | 1.008 | NG | NG | 89.7 | 99.0  | 100.0 | 100.0 | 100.0 | 100.0 |

TABLE 9

| | $(Ba_{1-\alpha}M_\alpha)_A(Ti_{1-\beta}Mn_\beta)_BO_3$ | | | | | | | | | | | |
|---|---|---|---|---|---|---|---|---|---|---|---|---|
| | A site | B site | | | | | | | | | | |
| Sample No. | element "M" | sub-stitution amount α | sub-stitution amount β | α/β | A/B | Specific surface area of obtained powder [m²/g] Heat-treating temperature | | | | | | |
| | | | | | | 1000° C. | 1050° C. | 1100° C. | 1150° C. | 1200° C. | 1250° C. | 1300° C. | 1350° C. |
| 11 | La | 0.01 | 0.14 | 0.07 | 1.008 | | | 5.9 | 3.0 | 1.4 | — | — | — |
| 51 | Dy | 0.01 | 0.14 | 0.07 | 1.008 | | | 5.9 | 3.0 | 0.9 | — | — | — |
| 52 | Gd | 0.01 | 0.14 | 0.07 | 1.008 | | | 5.3 | 2.8 | 0.8 | — | — | — |
| 53 | Ho | 0.01 | 0.14 | 0.07 | 1.008 | | | 5.2 | 2.8 | 0.7 | — | — | — |
| 54 | Y  | 0.01 | 0.14 | 0.07 | 1.008 | | | 5.3 | 2.9 | 1.0 | — | — | — |
| 55 | Er | 0.01 | 0.14 | 0.07 | 1.008 | | | 5.8 | 2.7 | 1.2 | — | — | — |
| 56 | Yb | 0.01 | 0.14 | 0.07 | 1.008 | | | 5.9 | 3.1 | 1.7 | — | — | — |
| 57 | Ce | 0.01 | 0.14 | 0.07 | 1.008 | | | 5.3 | 3.2 | 1.4 | — | — | — |
| 58 | Bi | 0.01 | 0.14 | 0.07 | 1.008 | | | 5.5 | 3.2 | 1.1 | — | — | — |

From the above, it was confirmed that the hexagonal type barium titanate powder according to the present invention includes hexagonal barium titanate as a main component and that the specific surface area thereof is 2 $m^2/g$ or more and thus particle size distribution thereof is narrow.

Experimental Example 4

After weighing the hexagonal type barium titanate powder and raw materials of subcomponents powder having an average particle diameter of 0.1 to 1.5 µm (MgO, CaO, BaO, $Mn_3O_4$, CuO, $Al_2O_3$, $Y_2O_3$, $Dy_2O_3$, $Gd_2O_3$, $Ho_2O_3$, $Yb_2O_3$, $Tb_2O_3$ and $SiO_2$—ZnO—$B_2O_3$ glass) so that composition after firing becomes composition shown in Table 10, water was added as a medium to the raw materials and mixed by a ball mill during 5 hours. Then, the mixture was dried so that mixed powder was obtained.

Note that, the above mentioned hexagonal type barium titanate powder was produced as similar with the experimental example 1, except for using La as the element "M", and setting α, β and A/B in the generic formula to α=0.01, β=0.06 and A/B=1.008. Also, a specific surface area of the hexagonal type barium titanate powder by BET method was 5 $m^2/g$, and a hexagonal barium titanate rate was 70%.

Dielectric layer paste was obtained by mixing 100 parts by weight of the mixture powder after drying obtained from the above manner and 4.8 parts by weight of acryl resin, 40 parts by weight of methylene chloride, 20 parts by weight of ethyl acetate, 6 parts by weight of mineral spirit and 4 parts by weight of acetone with a ball mill to make paste.

Also, 100 parts by weight of Ni particle, 40 parts by weight of organic vehicle (8 parts by weight of ethyl cellulose is dissolved to 92 parts by weight of butyl carbitol), 10 parts by weight of butyl carbitol were made to paste by kneading with three roll mill so that an internal electrode layer paste was obtained.

Also, 100 parts by weight of Cu particle, 35 parts by weight of organic vehicle (8 parts by weight of ethyl cellulose is dissolved to 92 parts by weight of butyl carbitol) and 7 parts by weight of butyl carbitol were made to paste by kneading so that an external electrode layer paste was obtained.

Next, a green sheet having 2.5 µm of thickness was formed on a PET film, after printing the internal electrode layer paste on the green sheet, the green sheet was removed from the PET film. Next, these green sheets and a protective green sheet (internal electrode layer paste is not printed) were stacked and bonded by pressure so that a green stacking body was obtained. A number of stacking sheets having the internal electrode were set as 100 layers.

Also, a green sheet having 6.5 µm of thickness was formed on the PET film by using the above mentioned dielectric layer paste, after printing the internal electrode layer paste on the green sheet, and the green sheet was removed from the PET film. Next, these green sheets and a protective green sheet (internal electrode layer paste is not printed) were stacked and bonded by pressure so that a green multilayer body was obtained. A number of stacking sheets having the internal electrode were set as 100 layers.

Next, the green stacking body was cut to a predetermined size and obtained a green chip, binder removal treatment, firing and reoxidation treatment (annealing) were performed to the green chip so that a multilayer ceramic capacitor firing body was obtained. The binder removal treatment was performed under a condition that a temperature rising rate 25° C./hour, a holding temperature 200° C., a holding time 8 hours, air atmosphere. Also, firing was performed under a condition that a temperature rising rate 200° C./hour, a holding temperature 1000° C., a holding time 2 hours, a cooling rate 200° C./hour, wet $N_2+H_2$ mixture gas atmosphere (oxygen partial pressure is adjusted within $1\times10^{-8}$ to $1\times10^{-6}$ Pa). The reoxidation treatment was performed under a condition that a holding time 900° C., a temperature holding time 2 hours, a cooling rate 200° C./hour, wet $N_2$ gas atmosphere (oxygen partial pressure is $1\times10^{-2}$ to 1 Pa). Note that, for wetting the atmospheric gas when firing and annealing, a wetter is used wherein a water temperature was set at 35° C.

Next, after polishing an end face of the multilayer ceramic firing body, an external electrode paste was transferred to the end face, fired at 900° C. during 60 minute in wet $N_2+H_2$ atmosphere so as to form an external electrode, and a sample of multilayer ceramic capacitor having constitution shown in FIG. 1 was obtained. Next, Sn plating film and Ni plating film were formed on an external electrode surface so that a sample for measuring was obtained.

A size of the respective sample obtained as above is 3.2 mm×1.6 mm×1.6 mm, a number of dielectric layer sandwiched by the internal electrode layers was 100, a thickness of the internal electrode layer was 2 µm. The above property evaluation was made for each of the samples.

TABLE 10

| Sample No. | Rare earthes | MgO | CaO | BaO | $Mn_3O_4$ and/or $Cr_2O_3$ | | CuO | $Al_2O_3$ | Glass component | ε | tan δ [%] | Insulation resistance [Ω] |
|---|---|---|---|---|---|---|---|---|---|---|---|---|
| | | | | | $Mn_3O_4$ | $Cr_2O_3$ | | | | | | |
| example 71 | Y: 0.1 | 1.0 | 3.0 | 3.0 | 0.3 | 0.0 | 0.4 | 0.3 | 0.10 | 30014 | 9.7 | 8.87E+07 |
| example 72 | Y: 0.1 | 2.0 | 2.0 | 2.0 | 0.5 | 0.0 | 0.3 | 0.2 | 0.50 | 28843 | 7.6 | 8.91E+07 |
| example 73 | Y: 0.1 | 3.0 | 1.0 | 1.0 | 1.0 | 0.0 | 0.2 | 0.1 | 1.00 | 21563 | 7.2 | 8.82E+07 |
| example 74 | Y: 0.5 | 1.0 | 3.0 | 3.0 | 0.3 | 0.0 | 0.4 | 0.3 | 0.10 | 22384 | 7.1 | 9.16E+07 |
| example 75 | Y: 0.5 | 2.0 | 2.0 | 2.0 | 0.5 | 0.0 | 0.3 | 0.2 | 0.50 | 21046 | 7.4 | 2.02E+08 |
| example 76 | Y: 0.5 | 3.0 | 1.0 | 1.0 | 0.0 | 1.0 | 0.2 | 0.1 | 1.00 | 18647 | 7.7 | 1.96E+08 |
| example 77 | Y: 1.0 | 1.0 | 3.0 | 3.0 | 0.3 | 0.0 | 0.4 | 0.3 | 0.10 | 16255 | 6.4 | 2.32E+09 |
| example 78 | Y: 1.0 | 2.0 | 2.0 | 2.0 | 0.5 | 0.0 | 0.3 | 0.2 | 0.50 | 14253 | 6.3 | 2.54E+09 |
| example 79 | Y: 1.0 | 3.0 | 1.0 | 1.0 | 0.5 | 0.5 | 0.2 | 0.1 | 1.00 | 10651 | 5.4 | 2.22E+09 |
| example 80 | Dy: 0.05, Gd: 0.05 | 1.0 | 3.0 | 3.0 | 0.3 | 0.0 | 0.4 | 0.3 | 0.10 | 27583 | 9.3 | 7.87E+07 |
| example 81 | Ho: 0.05, Tb: 0.05 | 1.0 | 3.0 | 3.0 | 0.3 | 0.0 | 0.4 | 0.3 | 0.10 | 25301 | 7.8 | 2.31E+07 |
| example 82 | Yb: 0.1 | 1.0 | 3.0 | 3.0 | 0.3 | 0.0 | 0.4 | 0.3 | 0.10 | 32576 | 9.8 | 5.82E+07 |
| example 83 | Y: 0.1 | 0.0 | 3.0 | 3.0 | 0.3 | 0.0 | 0.4 | 0.3 | 0.10 | 31254 | 9.6 | 3.27E+07 |
| example 84 | Y: 0.1 | 3.0 | 0.0 | 3.0 | 0.5 | 0.0 | 0.3 | 0.2 | 0.50 | 30259 | 7.2 | 8.78E+07 |
| example 85 | Y: 0.1 | 3.0 | 3.0 | 0.0 | 1.0 | 0.0 | 0.2 | 0.1 | 1.00 | 18967 | 6.1 | 9.82E+07 |
| comparative | Y: 0 | 1.0 | 3.0 | 3.0 | 0.3 | 0.0 | 0.4 | 0.3 | 0.10 | 45301 | 12.7 | 8.66E+06 |

TABLE 10-continued

| Sample No. | Rare earthes | MgO | CaO | BaO | $Mn_3O_4$ | $Cr_2O_3$ | CuO | $Al_2O_3$ | Glass component | $\epsilon$ | tan δ [%] | Insulation resistance [Ω] |
|---|---|---|---|---|---|---|---|---|---|---|---|---|
| example 71 comparative example 72 | Y: 0.1 | 0.5 | 0.5 | 0.5 | 0.3 | 0.0 | 0.4 | 0.3 | 0.10 | 31254 | 11.7 | 7.66E+06 |
| comparative example 73 | Y: 0.1 | 0.8 | 0.8 | 0.8 | 0.5 | 0.0 | 0.3 | 0.2 | 0.50 | 30259 | 10.8 | 8.84E+06 |
| comparative example 74 | Y: 0.1 | 3.0 | 3.0 | 5.0 | 0.3 | 0.0 | 0.4 | 0.3 | 0.10 | 9963 | 3.4 | 9.97E+07 |
| comparative example 75 | Y: 0.1 | 1.0 | 3.0 | 3.0 | 0.0 | 0.0 | 0.4 | 0.3 | 0.10 | 36877 | 12.0 | 7.86E+06 |
| comparative example 76 | Y: 0.1 | 1.0 | 3.0 | 3.0 | 1.5 | 0.0 | 0.4 | 0.3 | 0.10 | 8896 | 2.3 | 2.22E+09 |
| comparative example 77 | Y: 0.1 | 1.0 | 3.0 | 3.0 | 0.3 | 0.0 | 0.4 | 0.3 | 2.00 | 8754 | 2.7 | 1.23E+10 |
| comparative example 78 | Y: 0.1 | 1.0 | 3.0 | 3.0 | 0.3 | 0.0 | 0.4 | 0.3 | 0.00 | — | — | — |
| comparative example 79 | Y: 1.5 | 1.0 | 3.0 | 3.0 | 0.3 | 0.0 | 0.4 | 0.3 | 0.10 | 8865 | 7.2 | 2.19E+09 |
| comparative example 80 | Y: 1.5 | 2.0 | 2.0 | 2.0 | 0.5 | 0.0 | 0.3 | 0.2 | 0.50 | 7609 | 5.1 | 1.89E+09 |

Contents of MgO, CaO and BaO are shown in terms of oxide
Contents of $Mn_3O_4$, $Cr_2O_3$, CuO and $Al_2O_3$ are shown in terms of metal element
Contents of glass component are shown in terms of $SiO_2$
In table, "mE + n" shows "m × $10^n$"

Property evaluation for capacitor cannot be made to a sample 78 due to poor sintering.

Experimental Example 5

Contents of subcomponents, with respect to 100 moles of the main component, were set as 0.1 mole of rare earth, 1.0 mole of MgO, 1.0 mole of CaO, 1.0 mole of BaO, 0.1 mol of $Mn_3O_4$, 0.1 mole of CuO, 0.1 mole of $Al_2O_3$ and 0.1 mol of glass component, and kinds of the element "M", α, β and A/B in the generic formula were set as shown in Table 11. Except for the above, a capacitor was produced as similar with the experimental example 4, the above mentioned property evaluation was performed. Results are shown in Table 11.

Experimental Example 6

Contents of subcomponents, with respect to 100 moles of the main component, were set as 1.0 mol of rare earth, 3.0 moles of MgO, 3.0 moles of CaO, 3.0 moles of BaO, 1.0 mole of $Mn_3O_4$, 1.0 mole of CuO, 1.0 mole of $Al_2O_3$ and 1.0 mole of glass component, and kinds of the element "M", α, β and A/B in the generic formula were set as shown in Table 12. Except for the above, a capacitor was produced as similar with the experimental example 4, the above mentioned property evaluation was performed. Results are shown in Table 12.

TABLE 11

| | A site | B site | | | | Insulation |
|---|---|---|---|---|---|---|
| Sample No. | element "M" | substitution amount α | substitution amount β | A/B | $\epsilon$ | tan δ [%] | resistance [Ω] |
| example 91 | La | 0.003 | 0.03 | 1.008 | 31005 | 9.8 | 8.55E+07 |
| example 92 | La | 0.003 | 0.20 | 1.008 | 14381 | 5.1 | 9.87E+07 |
| example 93 | La | 0.050 | 0.03 | 1.008 | 32151 | 9.9 | 8.30E+07 |
| example 94 | La | 0.050 | 0.20 | 1.008 | 18557 | 6.5 | 8.97E+07 |
| example 95 | La | 0.010 | 0.06 | 0.900 | 20121 | 6.8 | 9.13E+07 |
| example 96 | La | 0.010 | 0.06 | 1.040 | 19551 | 6.1 | 9.33E+07 |
| example 97 | La | 0.008 | 0.05 | 1.008 | 21011 | 6.3 | 9.01E+07 |
| example 98 | La | 0.008 | 0.15 | 1.008 | 15690 | 5.8 | 9.46E+07 |
| example 99 | La | 0.010 | 0.05 | 1.008 | 27523 | 9.3 | 6.57E+07 |
| example 100 | La | 0.030 | 0.15 | 1.008 | 16657 | 5.3 | 9.51E+07 |
| example 101 | La | 0.010 | 0.06 | 0.958 | 21166 | 7.0 | 9.51E+07 |
| example 102 | La | 0.010 | 0.06 | 1.036 | 20051 | 7.1 | 8.99E+07 |
| example 103 | Dy | 0.010 | 0.06 | 1.008 | 16351 | 6.5 | 9.25E+07 |
| example 104 | Gd | 0.010 | 0.06 | 1.008 | 16677 | 6.7 | 8.98E+07 |
| example 105 | Ho | 0.010 | 0.06 | 1.008 | 15352 | 6.0 | 9.56E+07 |
| example 106 | Y | 0.010 | 0.06 | 1.008 | 16444 | 7.3 | 9.34E+07 |
| example 107 | Er | 0.010 | 0.06 | 1.008 | 17054 | 6.3 | 9.06E+07 |
| example 108 | Yb | 0.010 | 0.06 | 1.008 | 16843 | 7.1 | 9.21E+07 |

TABLE 11-continued

| Sample No. | A site element "M" | A site substitution amount α | B site substitution amount β | A/B | ε | tan δ [%] | Insulation resistance [Ω] |
|---|---|---|---|---|---|---|---|
| example 109 | Ce | 0.010 | 0.06 | 1.008 | 22015 | 7.3 | 8.74E+07 |
| example 110 | Bi | 0.010 | 0.06 | 1.008 | 26705 | 8.2 | 8.14E+07 |

0.1 mol of rare earth in terms of rare earth element,
1.0 mol of MgO, 1.0 mol of CaO, 1.0 mol of BaO respectively in terms of oxide,
0.1 mol of $Mn_3O_4$ in terms of metal element,
0.1 mol of CuO in terms of metal element,
0.1 mol of $Al_2O_3$ in terms of metal element,
0.1 mol of glass component in terms of $SiO_2$ with respect to 100 mol of a main component.
In table, "mE + n" shows "m × 10$^n$"

TABLE 12

| Sample No. | A site element "M" | A site substitution amount α | B site substitution amount β | A/B | ε | tan δ [%] | Insulation resistance [Ω] |
|---|---|---|---|---|---|---|---|
| example 121 | La | 0.003 | 0.03 | 1.008 | 22681 | 7.3 | 9.66E+07 |
| example 122 | La | 0.003 | 0.20 | 1.008 | 11763 | 4.3 | 1.33E+08 |
| example 123 | La | 0.050 | 0.03 | 1.008 | 26705 | 8.1 | 9.37E+07 |
| example 124 | La | 0.050 | 0.20 | 1.008 | 11105 | 5.8 | 9.46E+07 |
| example 125 | La | 0.010 | 0.06 | 0.900 | 12986 | 5.6 | 9.53E+07 |
| example 126 | La | 0.010 | 0.06 | 1.040 | 12623 | 5.6 | 9.73E+07 |
| example 127 | La | 0.008 | 0.05 | 1.008 | 13044 | 8.6 | 9.42E+07 |
| example 128 | La | 0.008 | 0.15 | 1.008 | 10333 | 4.8 | 1.54E+08 |
| example 129 | La | 0.010 | 0.05 | 1.008 | 17684 | 7.9 | 9.81E+07 |
| example 130 | La | 0.030 | 0.15 | 1.008 | 10782 | 5.0 | 1.88E+08 |
| example 131 | La | 0.010 | 0.06 | 0.958 | 11938 | 5.1 | 1.24E+08 |
| example 132 | La | 0.010 | 0.06 | 1.036 | 10861 | 4.9 | 1.05E+08 |
| example 133 | Dy | 0.010 | 0.06 | 1.008 | 11035 | 5.0 | 1.35E+08 |
| example 134 | Gd | 0.010 | 0.06 | 1.008 | 10977 | 5.3 | 9.97E+07 |
| example 135 | Ho | 0.010 | 0.06 | 1.008 | 10544 | 5.1 | 1.26E+08 |
| example 136 | Y | 0.010 | 0.06 | 1.008 | 11146 | 5.0 | 1.17E+08 |
| example 137 | Er | 0.010 | 0.06 | 1.008 | 10858 | 5.3 | 1.13E+08 |
| example 138 | Yb | 0.010 | 0.06 | 1.008 | 10634 | 5.3 | 1.34E+08 |
| example 139 | Ce | 0.010 | 0.06 | 1.008 | 11732 | 5.8 | 9.74E+07 |
| example 140 | Bi | 0.010 | 0.06 | 1.008 | 13176 | 6.0 | 1.01E+08 |

1.0 mol of rare earth in terms of rare earth element,
3.0 mol of MgO, 3.0 mol of CaO, 3.0 mol of BaO respectively in terms of oxide,
1.0 mol of $Mn_3O_4$ in terms of metal element,
1.0 mol of CuO in terms of metal element,
1.0 mol of $Al_2O_3$ in terms of metal element,
1.0 mol of glass component in terms of $SiO_2$ with respect to 100 mol of a main component.
In table, "mE + n" shows "m × 10$^n$"

From the above, according to the dielectric ceramic composition having hexagonal type barium titanate of the present invention as a main phase, electronic components such as a ceramic capacitor showing high specific permittivity, having advantageous insulation property and sufficient reliability are obtained.

What is claimed:

1. A hexagonal type barium titanate powder comprising barium titanate as a main component shown by a generic formula $(Ba_{1-\alpha}M_\alpha)_A(Ti_{1-\beta}Mn_\beta)_BO_3$ and having a hexagonal structure wherein:
   an effective ionic radius of 12-coordinated "M" is −20% or more to +20% or less with respect to an effective ionic radius of 12-coordinated $Ba^{2+}$,
   said A, B, α, and β satisfy:

$0.900 \leq (A/B) \leq 1.040$, $0.003 \leq \alpha \leq 0.05$, and $0.03 \leq \beta \leq 0.2$.

2. The hexagonal type barium titanate powder as set forth in claim 1, wherein:
   a ratio of said α and said β satisfies $(\alpha/\beta) \leq 0.40$.

3. A method of producing the hexagonal type barium titanate powder as set forth in claim 1 comprising steps of:
   preparing a raw material of barium titanate,
   preparing raw materials of an element "M" and Mn, and
   heat-treating said raw material of barium titanate and said raw materials of said element "M" and Mn.

4. A method of producing the hexagonal type barium titanate powder as set forth in claim 2 comprising steps of:
   preparing a raw material of barium titanate,
   preparing raw materials of an element "M" and Mn, and
   heat-treating said raw material of barium titanate and said raw materials of said element "M" and Mn.

5. A dielectric ceramic composition comprising hexagonal type barium titanate as a main component shown by a generic formula $(Ba_{1-\alpha}M_\alpha)_A(Ti_{1-\beta}Mn_\beta)_BO_3$ and having a hexagonal structure wherein:

an effective ionic radius of 12-coordinated "M" is −20% or more to +20% or less with respect to an effective ionic radius of 12-coordinated $Ba^{2+}$, and said A, B, α and β satisfy:

$0.900 \leq (A/B) \leq 1.040$, $0.003 \leq \alpha \leq 0.05$, and $0.03 \leq \beta \leq 0.2$, and as subcomponents, with respect to 100 moles of the main component, 1 to 3 moles of at least one of alkaline earth oxide selected from the group consisting of MgO, CaO, and BaO in terms of respective oxides, and a total content of said alkaline earth oxides is 9 moles or less; 0.1 to 1 mole of $Mn_3O_4$ and/or $Cr_2O_3$, CuO and $Al_2O_3$ in terms of respective metal elements; 0.1 to 1 mole of at least one of oxides of rare earth element selected from the group consisting of Y, La, Ce, Pr, Nd, Sm, Gd, Tb, Dy, Ho, and Yb in terms of a total of rare earth element; and 0.1 to 1 mole of a glass component including $SiO_2$ in terms of $SiO_2$.

6. An electronic component comprising a dielectric layer composed of the dielectric ceramic composition as set forth in claim 5 and an internal electrode layer.

\* \* \* \* \*